July 17, 1934.　　　F. E. FICK　　　1,966,619
GASOLINE METER
Filed Dec. 22, 1930　　　5 Sheets-Sheet 1

Inventor
FERDINAND E. FICK.
By Richey & Watts
Attorney

July 17, 1934.　　　F. E. FICK　　　1,966,619
GASOLINE METER
Filed Dec. 22, 1930　　　5 Sheets-Sheet 3

Inventor
FERDINAND E. FICK.
By Richey & Watts
Attorney

July 17, 1934.  F. E. FICK  1,966,619
GASOLINE METER
Filed Dec. 22, 1930  5 Sheets-Sheet 4

Inventor
FERDINAND E. FICK.
By Richey F. Watts
Attorney

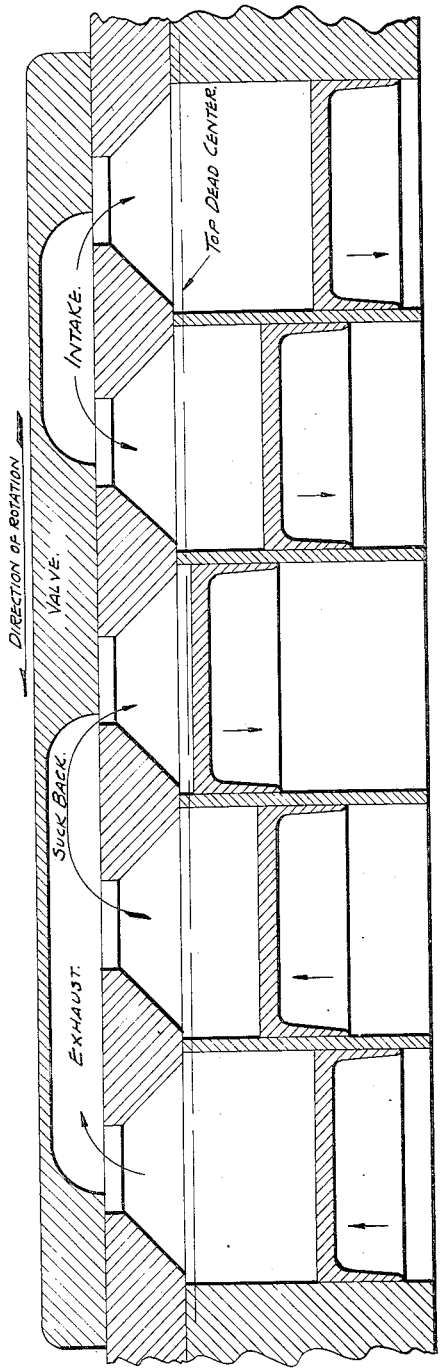
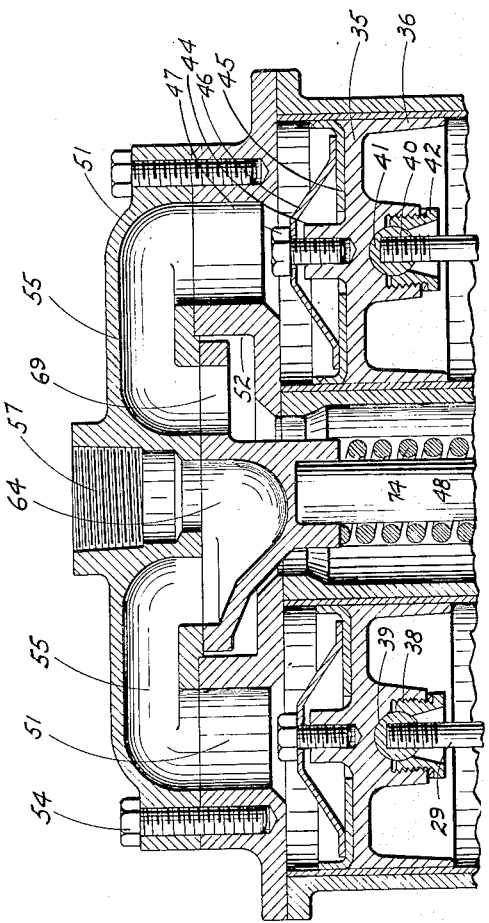

Patented July 17, 1934

1,966,619

UNITED STATES PATENT OFFICE 1,966,619

GASOLINE METER

Ferdinand E. Fick, Lakewood, Ohio, assignor to Western Reserve Air Motors Corporation, a corporation of Ohio Application December 22, 1930, Serial No. 503,874

28 Claims. (Cl. 73—30)

This invention relates to improvements in fluid metering devices and particularly relates to meters adaptable for use with pumps for dispensing hydro-carbon fuels.

Fluid meters have been constructed and are in considerable use which measure fluid by positive displacement. This is usually accomplished through the means of pistons in cylinders which are reciprocated in the cylinders by fluid pressure, a suitable valvular mechanism being provided to control the same. The pistons are usually connected to a suitable mechanism for changing the reciprocatory motion into a rotary motion to rotate a shaft and actuate a counter which indicates the amount of fluid displaced. It has, however, been a problem, difficult in solution, to make a meter which will consistently measure fluids with a constant degree of accuracy throughout various speeds of discharge of the fluid and various degrees of fluid pumping pressure. In this field it is quite common to find a meter, which when adjusted for accuracy of discharge at high speed will, when the speed is changed, be found to either pump more than is actually metered, or, in some instances, less than is metered. It is quite apparent to those versed in the art that meters are called upon to meet these variable conditions and that a meter may be secured to a pump that furnishes the fluid to the meter at 10 pounds pressure or the same meter may be coupled to a pump which delivers at 25 pounds fluid pressure. It is also apparent that in the use of such meters, which are commonly used with the so-called wet hose discharge type where the discharge is controlled at the end of the hose, that an operator may allow the same to discharge at maximum capacity or he may allow it to discharge at a very slow delivery rate depending upon the type of car to which the fuel is being fed and whether it is possible to allow the fluid to flow fast or whether it must be held back and allowed to flow slowly in order to prevent spilling the fuel. During the slower degrees of fluid flow it is possible for fluid leakages past the valves and pistons because there is more time for leakage during the cycle which is thought to be the cause of the aforesaid inaccuracies in measurement.

It is therefore one of the objects of the invention to provide a meter in which a high degree of accuracy in measurement is attained throughout a varying degree of fluid pressure and throughout a varying degree of volume discharge.

Another object of the invention is to provide a meter in which a greater degree of accuracy may be maintained without regard to the speed with which the fluid is dispensed.

Another object of this invention is to provide a meter within which slight discrepancies in the form of leakages past valves, pistons and the like, is compensated.

Another object of this invention is to provide an improved valvular mechanism for controlling the flow of fluid through a meter.

Another object of the invention is to provide an adjustment, which is readily accessible, which assures accurate measurement.

Still other objects of the invention reside in improvements in construction and operation which will become more apparent from the specification which is illustrated by the accompanying drawings.

In the drawings:—

Fig. 5 is a developed diagrammatical view to illustrate the relative action of the valve and pistons;

Fig. 6 is a fragmentary sectional view of the portion through the head taken on line 6—6 of Fig. 2;

Fig. 7 is a fragmentary sectional view of a modified stroke adjustment;

Figure 1:
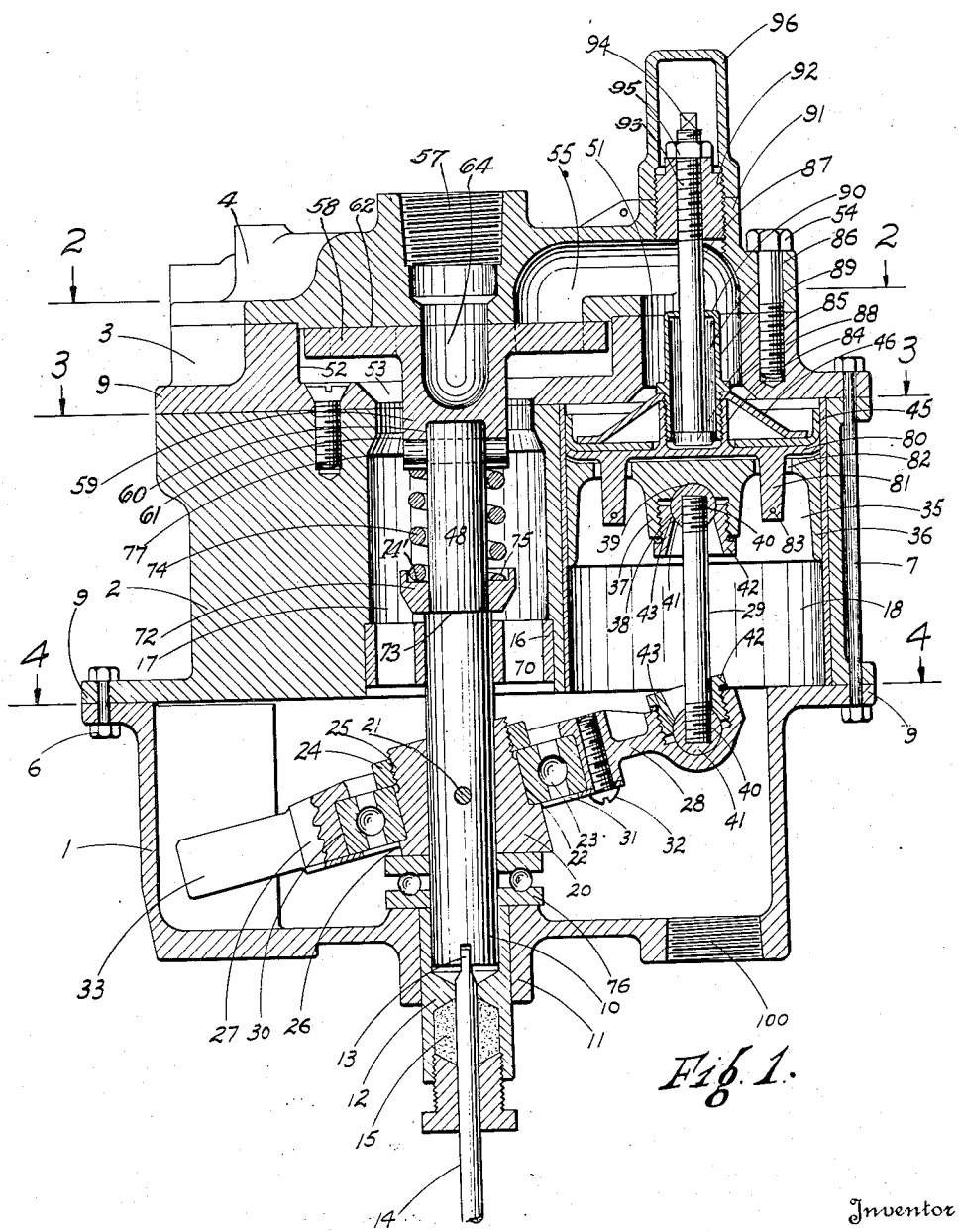
Fig. 1 is a vertical medial sectional view of a meter embodying the principles of this invention.
Figure 2:
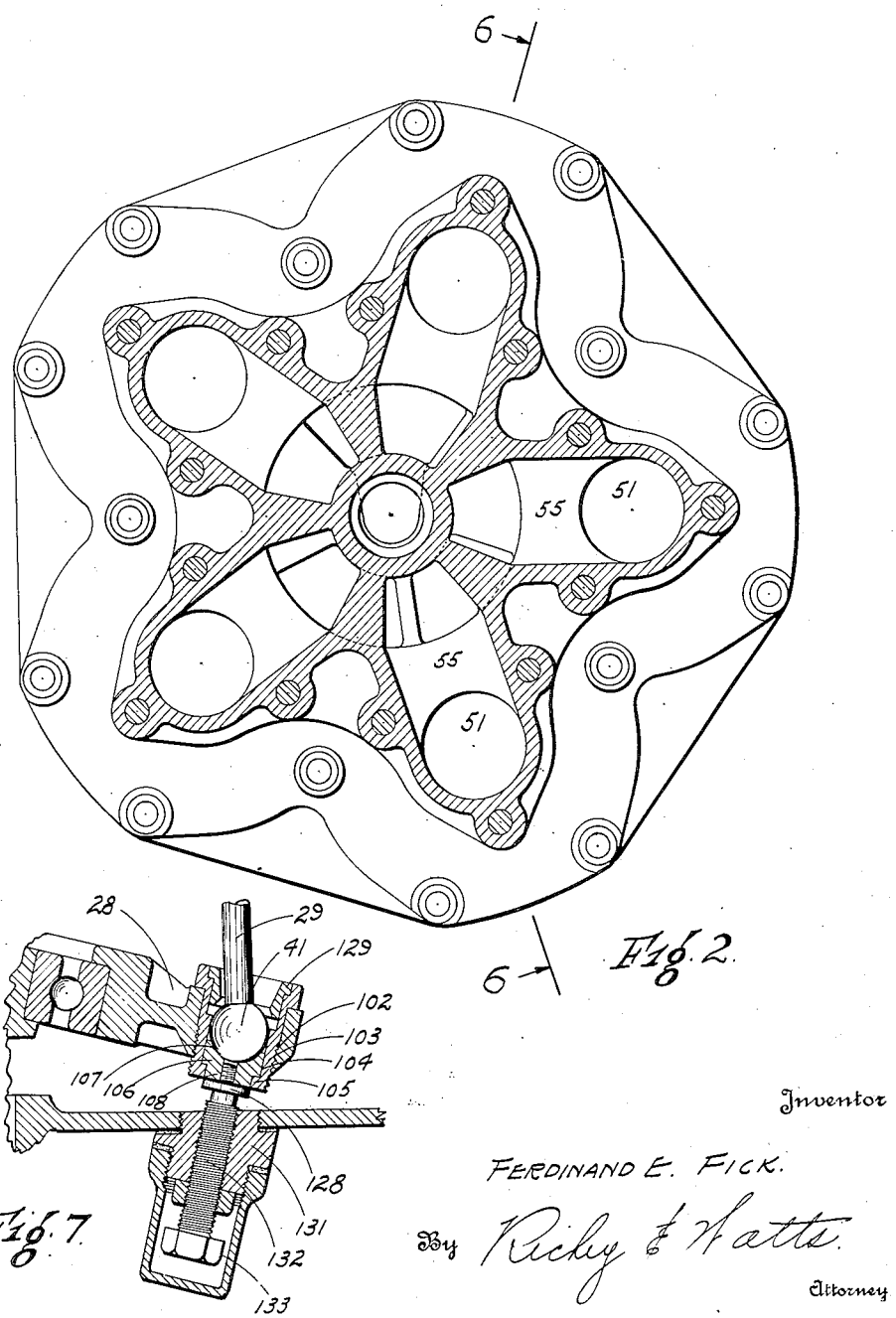
Fig. 2 is a view taken from the plane indicated by the line 2—2 of Fig. 1 looking in the direction of the arrows.

Broadly, the meter of this invention is adapted to be operated by the fluid pressure of the fluid which it is measuring. The pressure is exerted on the pistons through a properly timed valve cooperating with suitable inlet and outlet ports to cause the pistons to reciprocate and which recipracatory movement is transmitted to a wobble plate to a centrally disposed shaft. Each revolution of the shaft is adapted to operate a counter which registers the amount of fluid passing through the meter.

Specifically, the invention comprises a housing in which the wobble plate is enclosed and which will hereinafter be called a crank case, including a base housing 1, a cylinder block 2 being superposed upon the crank case, a head 3 disposed on the cylinder block, and a cover 4 affixed to the head. The separate parts may be secured together by suitable bolts or studs 6 and 7, disposed through the flanges 9 in the manner best illustrated in Fig. 1. A driven shaft 10 is journaled for rotation in a bearing 12, which is disposed in a bearing support 11 in the crank case. The lower extremity of the shaft is slotted transversely at 13 and another shaft 14 is engaged in the slot and is adapted to extend outward through a suitable packing gland 15, to a counter mechanism, not shown. An intermediate supporting bearing for the shaft 10 is provided at 16, being seated in a cylindrical passage 17 which is disposed centrally relative to the cylinders.

Figure 3:
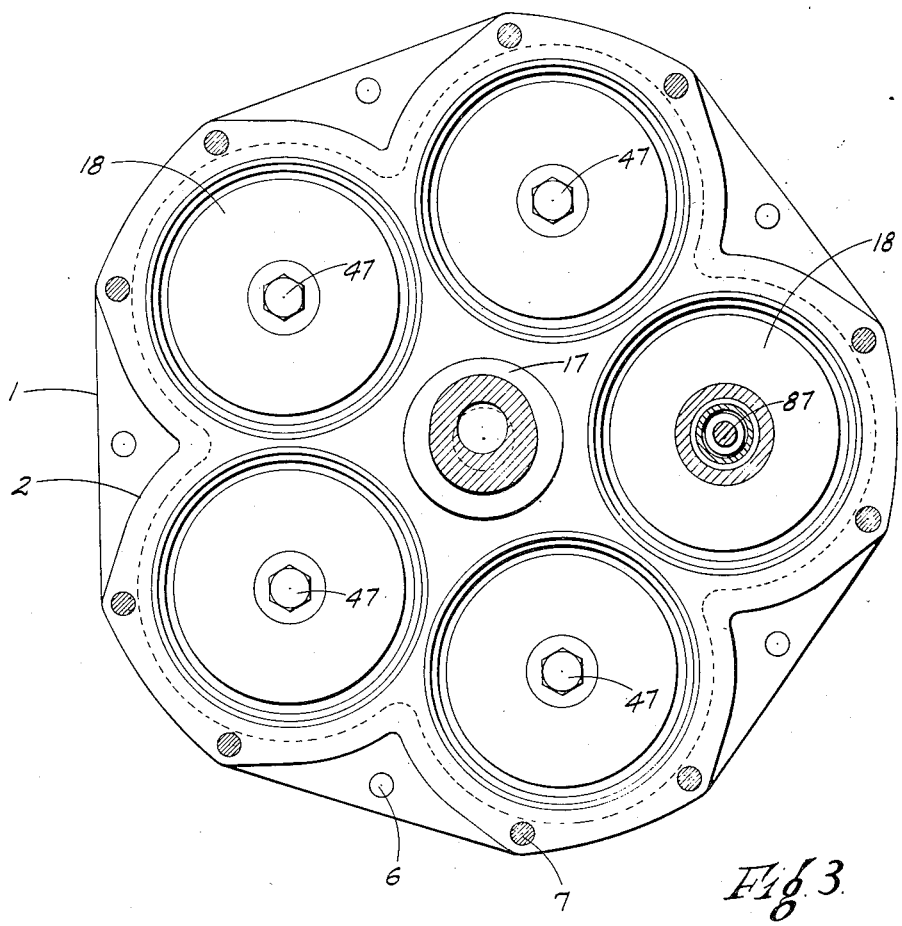
Fig. 3 is a similar view taken on the line 3—3.
Figure 4:
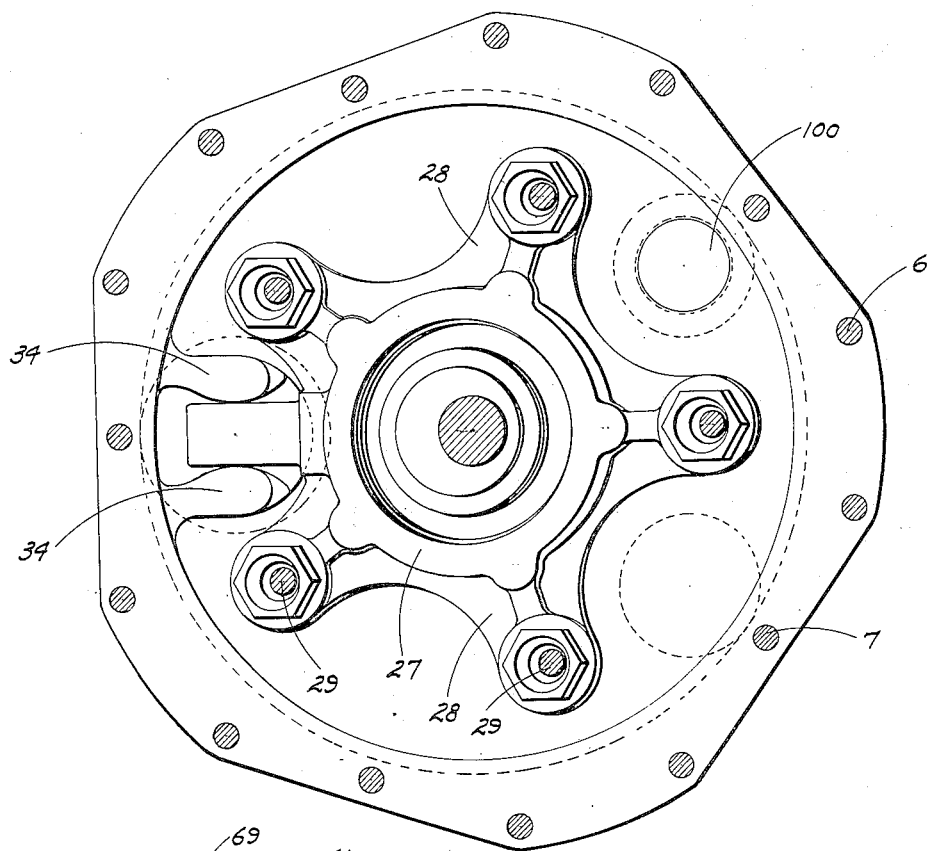
Fig. 4 is a view taken on the line 4—4 of Fig. 1.

The cylinder block 2 which is bolted to the crank case may be provided with five parallel cylinders 18 as best shown in Fig. 3, each axis of the cylinder being disposed in the circumference of a circle with the opening 17 at the axis of the circle. The cylinders may be provided with liners as illustrated.

A wobble plate is carried by the shaft 10 and comprises a hub 20 of cylindrical formation, pinned to the shaft by the pin 21. The axis of the hub is inclined relative to the axis of the shaft and the periphery is provided with a circumferential seat 22. A thrust bearing 76 is interposed between the bottom of the hub and the crank case about the drive shaft to take the downward thrust.

An annular type bearing 23 which comprises the usual inner and outer races with the interposed balls is secured upon the seat 22 of the hub by a lock nut 24 which is screwed upon a threaded end 25 of the hub and presses the inner race of the bearing securely against a flange 26 formed by the edge of the seat 22.

The outer race of the bearing, in turn, supports a spider or stroke ring member 27 which is provided with a plurality of arms 28 to which the connecting rods 29, later more fully described, are secured. The stroke ring has an annular seat 30 which embraces the outer race of the bearing 23 and is secured to the bearing by a locking ring 31 which overlaps the edge of the outer race and in turn is held to the stroke ring by cap screws or the like 32.

A torque arm 33 is carried by the stroke ring and extends between the walls 34 of a guide which is on one side of the crank case. The arm being engaged by the parallel sides 34 of the guide, may readily reciprocate longitudinally, but is unable to move laterally.

Connected to the stroke ring 27 by rods 29 are pistons 35 which may comprise a body having a skirt 36. A centrally disposed downwardly extending boss 37 is provided underneath the head of the piston and is axially bored and threaded at 38. The bottom of the bore has a parti-spherical detent 39 into which the ends of connecting rods may bear. Each connecting rod may comprise a rod having threaded ends 40, balls 41 being screwed thereupon. Threaded ferrules 42 are disposed intermediate the ends of the rod and are provided with parti-spherical seats 43 adapted to engage the balls 41. The ferrules are screwed into the threaded boss engaging the balls of the rods and hold the balls into the detent as shown in Fig. 1. The other end of the rod is secured to the arm 28 of the stroke ring 27 in substantially the same manner. The top of the piston is provided with centrally disposed upwardly extending threaded boss 44 and a packing 45 is disposed on top of the piston about the boss and is held into fluid tight engagement with the cylinder wall by a resilient spreader 46 which is secured to the boss by a screw 47. One end 48 of the driven shaft is of reduced diameter and extends substantially through the passage 17.

The top of the cylinders are covered by a head 3 which is secured thereto as previously described. The head 3 is provided with a plurality of ports 51 which extend therethrough, each port being in axial alignment with a cylinder. A centrally disposed valve chamber 52 is provided in the head which is in communication with the passage 17, by an opening 53.

The cover 4 is secured to the valve head by cap screws 54, and a plurality of channels or U shaped ducts 55 extend from above the valve chamber in the cylinder head to and connect with the ports 51 to provide connecting channels between the valve chamber and each of the cylinders. An inlet opening 57 is provided through the central top portion of the head and opens into the valve chamber.

Figure 8:
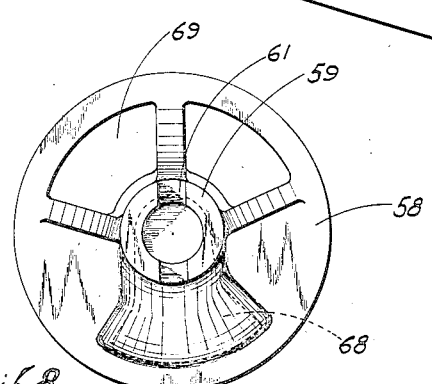
Fig. 8 is a bottom plan view of the valve.

A valve 58, a bottom plan view of which is illustrated in Fig. 8 is provided and is of generally circular disc formation having a downwardly extending central boss 59. The boss has a central bore 60 and the wall of the bore is slotted at 61 to provide for driving engagement with the end of the drive shaft.

The lower surface 62 of the cover is machined and lapped to provide a seat for the lapped face of the valve. An inlet duct 64 is provided in the valve and comprises a channel of irregular depth extending radially from below the inlet 57 of the cover to adjacent but spaced from the edge of the valve being widened fan-wise at 68 as best shown in Fig. 8 adapted to align at different periods of the cycle of operation of the meter with the inner end of the ducts 55 to provide a control for fluid admission to the cylinder. An arcuate outlet aperture 69 is disposed in the body of the valve and is adapted to be aligned with and allow the ducts 55 to be open to the valve chamber 52 below the valve throughout certain periods of the cycle to permit fluid flow from the cylinder to the passage 17 and hence through the openings 70 in the bearing 16 to the crank case.

The valve is supported within the valve chamber 52, being held tightly against the seat 62 of the cylinder cover by a helical spring 74 which is telescoped about the end 48 of the shaft. An annular washer or flange 72 is provided on the reduced end 48 of the shaft and abuts the shoulder 73 and has an annular seat 74' provided on one surface upon which the end 75 of the spring may rest. A drive pin 77 extends through the driven shaft spaced from the end. The upper end of the shaft extends into the bore 60 and the pin 77 extends into the slots and provides a means of rotating the valve when the shaft is rotated.

One means whereby a piston may be restricted in its motion to vary the capacity output of the meter per cycle is illustrated in Fig. 1. The piston head instead of having the packing 45 secured directly to the head is provided with a sub-head 80 which rests upon the head and has a pair of downwardly extending lugs 81 disposed through apertures 82 in the top of the piston head. The sub-head may be loosely secured to the piston head by cotter keys which extend through apertures 83 in the end of the lugs. The sub-head is provided with an upwardly extending bored threaded boss 84. The packing cup 45 which is held into fluid tight engagement with the cylinder walls by member 46 is disposed on the sub-head about said boss. Screwed into the boss 84 is a hollow coupling 89 provided with a circumferential flange 85 which engages the resilient spreader securing it between the edge of the boss 84 and the flange so that the spreader presses the packing against the cylinder wall. The coupling is provided with a cylindrical bore 86. An adjusting bolt 87 having a head 88 extends into the coupling adapted to engage the reentrant wall 90 at the end of the coupling. A hollow threaded boss 91 is provided in the cover 4 into which a plug 92 may be screw threaded. The plug 92 is bored and threaded to receive the threaded end 93 of the bolt 87. The bolt is provided with a square end 94 for rotating the same with a proper tool and may be locked into an adjusted position in the plug 92 by a lock nut 95.

The device operates as follows:

The fluid is supplied to the meter under a pressure which as previously stated may vary with the type of fluid pumps. It enters the intake 57 and is conducted by the duct 64 in the valve 58 to and through the conduit 55 into a cylinder 18 where the pressure exerted on top of the piston forces the piston downward. The downward travel of the piston is transmitted by the connecting rod through the stroke ring and bearing to the hub on the driven shaft which rotates the shaft. Rotation of the shaft is transmitted to a counter (not shown) through the counter shaft 14 which extends through the packing gland 15. The counter is calibrated and adjusted in accordance with the displacement of the cylinders.

During the downward or intake stroke of the cylinder the intake gradually opens to the next cylinder which starts the next piston downward before the first piston has reached the bottom of the stroke and this assures continuous operation of the meter throughout all degrees of varying volumetric discharge.

The downward movement of the piston forces the arm 28 downward causing the wobble plate to tilt and the shaft to rotate. The shaft in turn rotates the valve which when the downward movement has ceased closes the intake and upon the start of the upward movement allows the exhaust outlet 69 to register therewith. The intake having now provided communication with one of the other cylinders continues the filling of the succeeding cylinders causing the upward travel of the piston in the previously filled cylinder which exhausts the fluid through the exhaust 69 into the valve chamber in back of the valve where it passes through the passage 17, through the apertures in the driven shaft bearing into the crank case and outward through the exhaust outlet 100, the fluid now being metered is conducted through a hose, not shown, coupled to the threaded exhaust outlet to its destination.

In Fig. 5 I have shown a developed view showing the relative sizes of the intake and exhaust valve.

The spring which presses the valve upward into fluid tight engagement against the valve seat is sufficiently strong to overcome the pressure of the fluid being pumped and maintain the valve in fluid tight engagement with the seat. It may be here observed that a safety factor is present in that if the pressure should become excessive in the line instead of injuring the meter the valve is forced off of its seat and the fluid allowed to pass out of the outlet.

By referring to the diagrammatic view of Fig. 5 which may be considered as a developed view of a five cylinder meter wherein, from left to right, the first piston is starting upward on the exhaust stroke, the second piston has partially exhausted the cylinder, the third piston has completely exhausted the cylinder and is partially advanced on the intake stroke. However, the intake has not as yet opened and the exhaust is still open a slight amount. Consequently a slight amount of fluid which has already been metered is sucked back into the cylinder.

It has been found that by sucking back this previously metered fluid that leakage which occurs past the valve and piston which is not metered fluid, is thus compensated for. The reason for this is thought to be that during the slower speeds the time increment of the valve opening will permit slightly larger amounts of the previously exhausted fluid to flow back into the chamber prior to the admission of the intake fluid and that at the same time when the metering is slow it will be found that ordinarily more fluid will have time to leak past the piston and valve. When the device is operated at the higher volumetric speeds I have found that there is less leakage past the valve because of the lack of time for the fluid to seep past the valve and piston and that due to the inertia of the exhausted fluid and speed of operation of the valve there will be less of the exhausted fluid sucked back into the chambers than at the slow speeds. By thus designing the valve so that the exhaust occurs in the manner described, I find that the leakage which tends to render inaccuracies in a meter are substantially compensated, permitting a higher degree of accuracy of measurement.

In order to permit of accurate adjustment of the meter to dispense exact amounts of fluid, I have provided a means for limiting the travel of one of the pistons and hence the fluid volume discharge from a cylinder. The mechanical details have been previously described and the device operates as follows:

As best shown in Fig. 1, one of the pistons is provided with a sub-head. The fluid pressure on top of the sub-head forces the sub-head together with the piston downward in the usual manner. However as it nears the bottom of the stroke, where it is desired to limit the stroke, the re-entrant walls 90 of the coupling 89 engage the head of the adjusting bolt and prevents further travel of the sub-piston head. The remainder of the piston may readily proceed to the end of its travel being carried down from the force of the pistons in the other cylinders which are also engaged in the intake stroke, the sub-head parting from the main body of the piston within the limit of the lugs which extend through the piston. It may readily be seen that by removing the cap 96 from around the plug 92, the extent to which the bolt projects downward into the cylinder, may be regulated and thus the downward travel of the sub-head regulated to increase or decrease the capacity of the one cylinder and thus accurately determine the output of the meter.

In Fig. 7 there has been illustrated another form of adjustment for varying the actual amount of fluid dispensed in a complete cycle wherein the sub-head and ancillary parts have been eliminated, and the piston is the same as the other pistons. However, where the connecting rod is secured to the arm 28 of the stroke ring I have provided a threaded aperture 102 into which is screwed a socket 103 having a smooth bore 104 with re-entrant walls 105 at one end thereof. A slidable member 106 is disposed in the bore and has a parti-spherical seat 107 on the surface adjacent the ball 41 of the rod for the rod. The reduced end 108 of the member 106 extends beyond the re-entrant walls 105. Into the end 108 is screwed a steel or other hard metal contact screw 128. The slidable member 106 is reciprocable within the bore 104. The connecting rod is retained within the socket 103 of the stroke arm by a bushing 129. The bushing 129 may be securely held in the upper portion of the socket 103 by a press-fit or by screw threading therein. There is sufficient clearance between the bushing 129 and the end 41 of the rod to permit a slight longitudinal movement of the rod relative to the stroke arm.

Means is provided to limit the stroke of the piston and includes an adjustment bushing 131 which is secured to the walls of the housing substantially as shown and through which a screw stop 132 projects and which may be locked in position by a lock nut 133. A suitable cap may be provided to cover the adjusting screw which may be sealed in any approved manner. In operation the limit of the movement of the entire piston in this instance is regulated. At the end of the downward stroke the screw stop 132 engages the contact screw 128 and the bushing 106. The adjustable stop having thus engaged the seat for the connecting rod prevents further downward movement of the connecting rod. The stroke ring being unhindered continues with its cycle the seat member 106 slides within the socket 103. Sufficient ample adjustment may be provided by this means to vary the capacity measured by the meter to assure that the material dispensed is accurately measured.

Although throughout the specification and drawings the device of the invention has been shown in a particular position it is to be understood that a meter constructed as shown may be operated in any position, viz: laying on its side or upside down.

Having thus described my invention in an embodiment thereof, I am aware that numerous and extensive departures may be made therefrom, but without departing from the spirit and scope of the appended claims.

I claim:

1. In a fluid meter including, a crank case, a cylinder block, a cylinder head and a housing in superposed relation to each other, said housing having an inlet, the cylinders in the block being disposed with their axes in a circumference of a cylinder, a driven shaft, bearings in the crank case and cylinder block for supporting the driven shaft intermediate the cylinders with its axis parallel to each of the cylinders, axes, a wobble plate comprising a hub secured to the shaft, a bearing secured to the hub, and a stroke ring supported by the bearing, pistons disposed in the cylinders, means connecting the pistons to the stroke ring, said housing having conduits and a valve surface disposed in said conduits, said conduits opening to the valve surface and extending radially therefrom, said cylinder head having apertures opening to the cylinders and in communication with the extremities of said conduits, said cylinder head having a valve chamber disposed therein, a valve disposed in the chamber and abutting said valve surface in the housing, said valve comprising a hub portion, said hub having an axial recess therein and a slot extending through the hub and intersecting the axis of the recess, said valve having a channel disposed in the face of the valve extending from the center of the valve to adjacent the edge of the valve, the center of the channel adapted to align with the inlet through the housing and the extremity of the channel adapted to align with the conduits, said valve having an aperture adjacent the periphery alignable with the inlet to the conduits, an end of the shaft being of reduced diameter, a collar disposed upon the reduced end of said shaft abutting the shoulder thereon, a spring telescoped about the shaft intermediate the collar and the hub of the valve, the end of the shaft extending into the aperture of the hub, said spring adapted to urge the valve toward the valve surface.

2. In combination with a fluid meter comprising a housing, pistons and cylinders in the housing, a driven shaft and a wobble plate for driving the shaft, said wobble plate including a stroke ring and rods connecting the pistons to the stroke ring, means to limit the stroke of one of the pistons comprising an adjustable abutment for engaging the end of the connecting rod structure or the wobble plate at the connection of one connecting rod.

3. In combination with a fluid measuring device comprising a housing, cylinders and pistons in the housing, a driven shaft and a wobble plate supported thereby, rods connecting the pistons to the wobble plate, means for limiting the stroke of one of the pistons, comprising an adjustable abutment adapted to engage one of the connecting rods to limit the movement thereof.

4. A fluid meter having a body provided with a plurality of cylinders, pistons in the cylinders, a wobble plate, a shaft supporting said plate and arranged to be rotated thereby, means connecting the pistons to the plate, said body having inlet and outlet passages and ducts for connecting the cylinders with the inlet and outlet passages, a valve rotatably arranged within the body and connected to said shaft presenting to the inlet passage a valve face perpendicular to the axis of rotation of the valve, resilient means urging said valve against the pressure of incoming fluid, said valve being provided with passages to conduct fluid to and from said cylinders.

5. A fluid meter comprising a cylinder block provided with a plurality of circularly disposed parallel cylinders and a passage disposed in parallel relation to the cylinders, a casing mounted on one end of the cylinder block, an axle journalled in the cylinder block and casing and extending axially into the passage, a wobble plate mounted on the axle for rotating the latter, pistons in the cylinders, means connecting the pistons and wobble plate, a housing mounted on the other end of the cylinder block, said housing being provided with an inlet and a valve chamber and channels to connect the valve chamber with the cylinders, said valve chamber being in communication with said passage, a valve rotatably disposed in the valve chamber and connected with the axle for rotation thereby, said valve having apertures arranged to conduct fluid from the inlet to the channels and from the channels to the passage, said casing having an outlet.

6. A fluid meter comprising a cylinder block provided with a plurality of circularly disposed parallel cylinders and a passage disposed in parallel relation to the cylinders, a casing mounted on one end of the cylinder block, an axle journalled in the cylinder block and casing and extending axially into the passage, a wobble plate mounted on the axle for rotating the latter, pistons in the cylinders, means connecting the pistons and wobble plate, a housing mounted on the other end of the cylinder block, said housing being provided with an inlet and a valve chamber and channels to connect the valve chamber with the cylinders, said valve chamber being in communication with said passage, a valve rotatably disposed in the valve chamber and connected with the axle for rotation thereby, said valve having apertures arranged to conduct fluid from the inlet to the channels and from the channels to the passage, said casing having an outlet, said valve presenting to the inlet a valve face perpendicular to the axis of rotation of the valve, and resilient means for urging the valve against the pressure of incoming fluid.

7. A fluid meter comprising a cylinder block provided with a plurality of circularly disposed parallel cylinders and a passage disposed in parallel relation to the cylinders, a casing mounted on one end of the cylinder block, an axle journalled in the cylinder block and casing and extending axially into the passage, a wobble plate mounted on the axle for rotating the latter, pistons in the cylinders, means connecting the pistons and wobble plate, a housing mounted on the other end of the cylinder block, said housing being provided with an inlet and a valve chamber and channels to connect the valve chamber with the cylinders, said valve chamber being in communication with said passage, a valve rotatably disposed in the valve chamber and connected with the axle for rotation thereby, said valve having apertures arranged to conduct fluid from the inlet to the channels and from the channels to the passage, said casing having an outlet, and adjustable means for varying the stroke of one of the pistons.

8. A fluid meter comprising a body having a plurality of circularly disposed cylinders therein, pistons in the cylinders, an axle journalled in the body, a wobble plate on the axle for rotating the latter, connecting rods connecting the pistons and wobble plate, said body having passages leading to said cylinders and a valve connected to the axle for controlling the flow of fluid through said passage, adjustable means carried by the body and acting on the piston and connecting rod structure or the wobble plate at the connection of one connecting rod for adjusting the stroke of one of the pistons.

9. A fluid meter comprising a body having a plurality of circularly disposed cylinders therein, pistons in the cylinders, an axle journalled in the body, a wobble plate on the axle for rotating the latter, connecting rods joining the pistons and wobble plate, said body having passages leading to said cylinders and a valve connected to the axle for controlling the flow of fluid through said passage, a lost motion connection for joining one of said connecting rods and plate, and an adjustable abutment carried by the body for engaging said lost motion connection and limiting the stroke of the connecting rod.

10. In a fluid meter, comprising a housing, cylinders in the housing, pistons in the cylinders, a shaft journalled in the housing, a wobble plate connected to the shaft, connecting rods for connecting the pistons to the wobble plate, one of said connecting rods being capable of longitudinal movement relative to the wobble plate, an adjustable stop for limiting the relative movement of the connecting rod.

11. In a fluid meter, comprising a housing, cylinders in the housing, pistons in the cylinders, a shaft rotatably journalled in the housing, a wobble plate for driving the shaft, connecting rods for the pistons, means to connect the connecting rods to the wobble plate, one of said connecting means comprising a lost motion coupling adapted to permit movement of the rod independent of the wobble plate, an abutment for the end of the rod and movable therewith, a second abutment carried by the housing adapted to engage the first abutment to limit the stroke of the connecting rod.

12. In a fluid meter, comprising a housing, cylinders in the housing, pistons in the cylinders, connecting rods for the pistons, a drive shaft, a wobble plate on the drive shaft, means connecting the wobble plate to the connecting rods, means to limit the stroke of one of the rods comprising a lost motion coupling between the rod and the wobble plate, a seat for the end of said rod in said lost motion coupling, an adjustable abutment on the housing adapted to engage the seat for the connecting rod to limit the stroke of said rod.

13. In a fluid meter, comprising a housing, cylinders in the housing, pistons in the cylinders, connecting rods for the pistons, a drive shaft, a wobble plate on the drive shaft, means connecting the wobble plate to the connecting rods, means to limit the stroke of one of the rods comprising a lost motion coupling between the rod and the wobble plate, a seat for the end of said rod in said lost motion coupling, an adjustable abutment on the housing adapted to engage the seat for the connecting rod near the end of the stroke to limit the stroke of said rod.

14. In a fluid meter, comprising a housing, cylinders in the housing, pistons in the cylinders, connecting rods for the pistons, a drive shaft, a wobble plate on the drive shaft, means connecting the wobble plate to the connecting rods, means to limit the stroke of one of the rods comprising a lost motion coupling between the rod and the wobble plate, a seat for the end of said rod in said lost motion coupling, an adjustable abutment on the housing adapted to engage the seat for the connecting rod near the end of the stroke to limit the stroke of said rod, said adjustment including a threaded member adjustable in the line of travel of said rod.

15. In a fluid meter, comprising a housing, cylinders in the housing, pistons in the cylinders, connecting rods for the pistons, a drive shaft, a wobble plate on the drive shaft, means connecting the wobble plate to the connecting rods, means to limit the stroke of one of the rods comprising a lost motion coupling between the rod and the wobble plate, a seat for the end of said rod in said lost motion coupling, an adjustable abutment on the housing adapted to engage the seat for the connecting rod near the end of the stroke to limit the stroke of said rod, said adjustment including a threaded member adjustable in the line of travel of said rod, means to lock said adjustment in adjusted position.

16. In a fluid meter, comprising a housing, cylinders in the housing, pistons in the cylinders, connecting rods for the pistons, a driven shaft rotatably journalled in the housing, a wobble plate for the shaft, said housing formed to provide fluid conduits to the cylinders; a valve connected to said shaft for controlling the flow of fluid to and from said cylinders; said connecting rods connected to said wobble plate; means to adjust the fluid capacity of the meter comprising a bushing carried by the wobble plate and formed with a central bore therethrough, one end of one of the connecting rods disposed therein, a seat for the connecting rod slidable within the bushing, reentrant walls at one end of the bushing to absorb the thrust upon the seat by the connecting rod, a boss on the housing, an adjustment member extending through the boss in threaded engagement therewith and adapted to contact with the rod seat near the end of the stroke of the piston to limit the movement of the connecting rod and piston.

17. In a fluid meter, comprising a housing, cylinders in the housing, pistons in the cylinders, connecting rods for the pistons, a driven shaft rotatably journalled in the housing, a wobble plate for the shaft, said housing formed to provide fluid conduits to the cylinders; a valve connected to said shaft for controlling the flow of fluid to and from said cylinders; said connecting rods connected to said wobble plate; means to adjust the fluid capacity of the meter comprising a bushing carried by the wobble plate and formed with a central bore therethrough, one end of one of the connecting rods disposed therein, a seat for the connecting rod slidable within the bushing, reentrant walls at one end of the bushing to absorb the thrust upon the seat by the connecting rod, a boss on the housing, an adjustment member extending through the boss in threaded engagement therewith and adapted to contact with the rod seat near the end of the stroke of the piston to limit the movement of the connecting rod and piston, locking means for the adjustment member to lock the same in adjusted position.

18. In a fluid pressure operated meter comprising, a housing, cylinders in the housing, pistons reciprocable in the cylinders, a driven shaft rotatably journalled in the housing, a wobble plate for the shaft, connecting rods connecting the pistons to the wobble plate; said housing formed to provide fluid passages to the cylinders, and an inlet and an outlet; a valve connected to said shaft for controlling fluid flow to said passages, a valve seat in the housing for the valve, means for urging the valve toward the seat and against the fluid pressure of the inlet.

19. In a fluid pressure operated meter, a housing, cylinders in the housing, a shaft, a wobble plate connected to said shaft, pistons reciprocable in the cylinders, rods connecting the pistons to the wobble plate; said housing formed to provide an intake chamber, an exhaust chamber, and ducts from said chambers to said cylinders; a valve to control the flow of fluid between said chambers and the cylinders, said valve being connected to said shaft and comprising a valve body, a seat on the valve, a seat in the housing, said valve having an inlet channel and an outlet port, means to resiliently retain the valve seated against the pressure of fluid entering the inlet chamber.

20. In a fluid pressure operated meter comprising, a housing, cylinders in the housing, pistons reciprocable in the cylinders, a driven shaft rotatably journalled in the housing, a wobble plate for the shaft, connecting rods connecting the pistons to the wobble plate; said housing formed to provide fluid passages to the cylinders, and an inlet and an outlet; a valve seat in the housing, said inlet being disposed through the center of the valve seat, a valve connected to said shaft for controlling the fluid passages, means for urging the valve toward the seat.

21. In a fluid pressure operated meter, a housing, a plurality of paraxially disposed cylinders in the housing, a shaft rotatably disposed in the housing intermediate said cylinders, a wobble plate carried by the shaft for rotating the same, pistons reciprocably disposed in the cylinders, connecting rods connecting the pistons to the wobble plate; said housing formed to provide an inlet and an outlet and ducts connecting the inlet and outlet to the cylinders; a valve seat, said inlet opening through the valve seat, a valve connected to said shaft for controlling the flow of fluid through the inlet and said ducts and adapted to be seated on said seat, spring means for urging said valve toward said seat and against the pressure of fluid in said inlet.

22. In a fluid pressure operated meter, a housing, a plurality of parallel cylinders disposed in the housing, a shaft rotatably disposed in the housing and surrounded by said cylinders, a wobble plate carried by the shaft for rotating the same, pistons reciprocably disposed in the cylinders, connecting rods connecting the pistons to the wobble plate; said housing formed to provide an inlet and an outlet and ducts connecting the inlet and outlet to the cylinders; a valve seat, said inlet opening through the valve seat, a valve connected to said shaft for controlling the flow of fluid through the inlet and said ducts and adapted to be seated on said seat, spring means for urging said valve toward said seat and against the pressure of incoming fluid in said inlet and adapted to permit the valve to be forced from its seat when the fluid pressure in the inlet overcomes the pressure of said spring.

23. In a fluid pressure operated meter, comprising a housing, a plurality of cylinders disposed in the housing, pistons reciprocable in said cylinders, a driven shaft rotatably disposed in the housing, a wobble plate for driving said shaft, connecting rods connecting said pistons to said wobble plate; said housing formed to provide an inlet and an outlet, and a valve chamber with ducts leading from the cylinders to the valve chamber; a valve seat in said valve chamber, said inlet and said ducts opening in said seat, a valve for said seat rotatable by said shaft and covering the inlet and duct openings, spring means for the valve to hold the same against said seat and opposed to the pressure of incoming fluid in said inlet, said valve formed to provide a fluid inlet passage and an outlet passage and adapted to control the flow of fluid from said inlet to said cylinders and from said cylinders to said outlet.

24. In a fluid pressure operated meter, comprising a housing, a plurality of cylinders disposed in the housing, pistons reciprocable in said cylinders, a driven shaft rotatably disposed in the housing, a wobble plate for driving said shaft, connecting rods connecting said pistons to said wobble plate; said housing formed to provide an inlet and an outlet and a valve chamber with ducts leading from the cylinders to the valve chamber; a valve seat in said valve chamber, said inlet and said ducts opening to said seat, a valve for said seat rotatable by said shaft and covering the inlet and duct openings, spring means for the valve surrounding the shaft to hold the valve against said seat and opposed to the pressure of incoming fluid in said inlet, said valve formed to provide a fluid inlet passage and an outlet passage and adapted to control the flow of fluid from said inlet to said cylinders and from said cylinders to said outlet.

25. In a fluid pressure operated meter comprising a housing, a plurality of cylinders disposed in the housing, pistons reciprocable in said cyinders, a driven shaft rotatably disposed in the housing, a wobble plate for driving said shaft, connecting rods connecting said pistons to said wobble plate; said housing formed to provide an inlet and an outlet, and a valve chamber with ducts leading from the cylinders to the valve chamber, a valve seat in said valve chamber, said inlet and said ducts opening in said seat, a valve for said seat rotatable by said shaft and covering the inlet and duct openings, spring means for the valve mounted on the shaft and rotatable therewith to hold the valve against said seat and opposed to the pressure of incoming fluid in said inlet, said valve formed to provide a fluid inlet passage and an outlet passage and adapted to control the flow of fluid from said inlet to said cylinders and from said cylinders to said outlet.

26. In a fluid pressure operated meter comprising a housing, a plurality of cylinders disposed in the housing, pistons reciprocable in said cylinders, a driven shaft rotatably disposed in the housing, a wobble plate for driving said shaft, connecting rods connecting said pistons to said wobble plate; said housing formed to provide an inlet and an outlet, and a valve chamber with ducts leading from the cylinders to the valve chamber; a valve seat in said valve chamber, said inlet and said ducts opening to said seat, a valve for said seat rotatable by said shaft and covering the inlet and duct openings, a thrust member supported by the shaft, spring means surrounding the shaft and rotatable therewith seated on said thrust member and bearing against said valve to hold the valve against said valve seat opposed to pressure of incoming fluid in said inlet, said valve formed to provide a fluid inlet passage and an outlet passage and adapted to control the flow of fluid from said inlet to said cylinders and from said cylinders to said outlet.

27. In a fluid pressure operated meter, comprising a housing, cylinders in the housing, pistons reciprocable in the cylinders, connecting rods for the pistons, a shaft rotatbly journalled in the housing, means connecting the shaft to the pistons; said housing formed to provide fluid passages to the cylinders and an inlet and an outlet; a valve connected to said shaft for controlling fluid flow to said passages, a valve seat for the valve, means for urging the valve toward the seat and against the fluid pressure of said inlet.

28. In a fluid pressure operated meter, comprising a housing, cylinders in the housing, pistons reciprocable in the cylinders, a driven shaft rotatably journalled in the housing, a wobble plate for the shaft, connecting rods connecting the pistons to the wobble plate, one of said connecting rods being provided with a lost motion coupling between the rod and wobble plate; said housing formed to provide fluid passages to the cylinders, and an inlet and an outlet; a valve connected to said shaft for controlling fluid flow to said passages, a valve seat in the housing for the valve, means for urging the valve toward the seat and against the fluid pressure of the inlet; means to limit the stroke of one of the pistons comprising an adjustable abutment for engaging the end of the connecting rod structure or the wobble plate at the connection of one connecting rod.

FERDINAND E. FICK.